A. MAUL.
LINEAR DIMENSION GAGE.
APPLICATION FILED MAY 8, 1912.
1,044,555.
Patented Nov. 19, 1912.
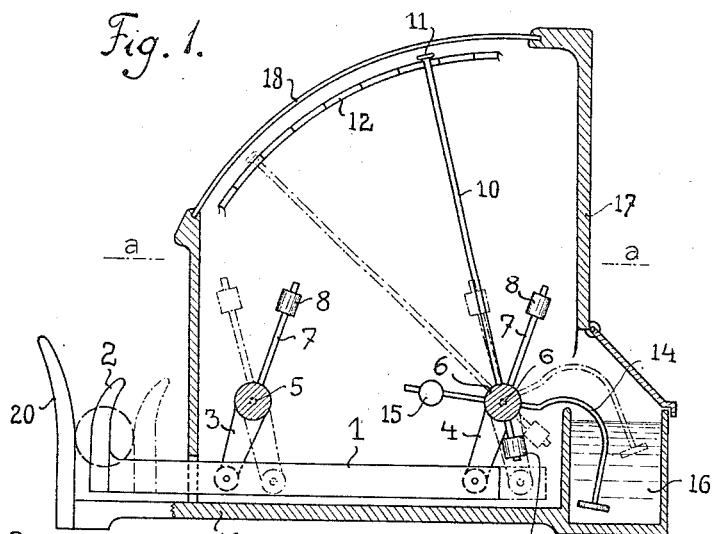
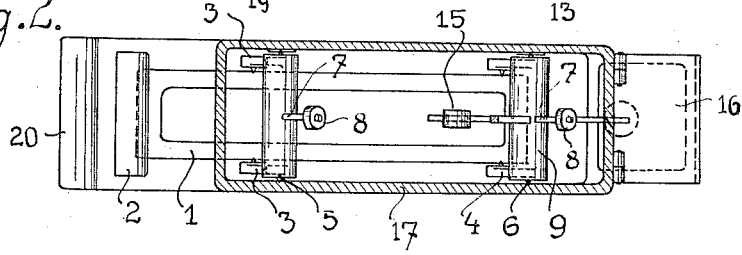
WITNESSES:
INVENTOR:
Alfred Maul

UNITED STATES PATENT OFFICE.

ALFRED MAUL, OF DRESDEN, GERMANY.

LINEAR-DIMENSION GAGE.

1,044,555.

Specification of Letters Patent. Patented Nov. 19, 1912.

Application filed May 8, 1912. Serial No. 695,930.

*To all whom it may concern:*

Be it known that I, ALFRED MAUL, a subject of the Emperor of Germany, residing at Dresden, Germany, have invented certain Improvements in Linear-Dimension Gages, of which the following is a specification.

The present invention relates to a device for measuring linear-dimensions such as the diameter of certain objects particularly of inflated guts or the like which offer small resistance to the gage elements and the exact dimensions of which are therefore difficult to ascertain.

The invention consists in the construction and combination of parts as hereinafter set forth and claimed with reference to the accompanying drawings of which—

Figure 1 represents a vertical section of the apparatus, and Fig. 2, a horizontal section on the line $a-a$ of Fig. 1.

In the lower part of a casing 17 two shafts 5 and 6 are mounted so as to be capable of easy rotary movement. From said shafts a horizontal gage bar 1 is suspended by means of forked arms 3 and 4 respectively. One end of the gage bar projects through a slot in the front wall of the casing and is fitted with an upright broad lug 2 between which and a similar lug 20, connected to the casing 17, the articles to be measured are disposed as shown in Fig. 1.

The measurements are indicated by a pointer 11 which moves over a scale 12 and which is connected to an arm 10 mounted on the shaft 6. A window 18 is provided in the top-wall of the casing through which the scale and the pointer can be viewed.

Weights 8, fitted on arms 7 on the two shafts, balance the arms 3 and 4 and the gage bar. Another weight 13 on the shaft 6 balances the arm 10. In order to damp the movements of the gage bar a dash-pot may be provided in the form of a bent arm 14 connected to the shaft 6 and having its free end disposed in a receptacle 16 containing oil or the like. A disk is fitted on the end of the arm so as to move in the liquid and act as a damper. An apparatus constructed in this manner enables the exact measurements of sensitive articles such as previously mentioned to be conveniently ascertained.

I claim:—

1. A linear-dimension gage, comprising a casing, a gage-bar, pivoted arms by which said gage-bar is suspended in the casing in a horizontal position, a broad upright lug on one end of said bar, a lug on the casing registering with said former lug for gaging articles in coöperation therewith, and means for indicating the measurements.

2. A linear-dimension gage, comprising a casing, two shafts rotatably held in said casing, forked arms on said shafts, a gage-bar suspended by said arms in horizontal position, a broad upright lug on one end of said bar, a lug on the casing registering with said former lug for gaging articles in coöperation therewith, weights mounted on the shafts for balancing the bar, and means for indicating the measurements.

3. A linear-dimension gage, comprising a casing, two shafts rotatably held in said casing, forked arms on said shafts, a gage bar suspended by said arms in a horizontal position, a broad upright lug on one end of said bar, a lug on the casing registering with said former lug for gaging articles in coöperation therewith, a scale connected to the casing, a pointer carried by one of said shafts so as to move over said scale and indicate the measurements, and weights for balancing the bar and the pointer.

4. A linear-dimension gage, comprising a casing, a gage bar suspended in said casing in a horizontal position, a broad upright lug on one end of the bar, a lug on the casing registering with said former lug for gaging articles in coöperation therewith, means for indicating the measurements, means for balancing the bar, and means for damping the movements of said bar.

5. A linear-dimension gage, comprising a casing, two horizontal shafts rotatably mounted in said casing, forked arms on said shafts, a gage bar suspended by said arms in a horizontal position, a broad upright lug on one end of said bar, a lug on the casing registering with said former lug for gaging articles in coöperation therewith, a scale connected to the casing, a pointer carried by one of said shafts so as to move over the scale and indicate the measurements, an oil receptacle, a bent arm connected to one shaft so as to have its free end disposed in said receptacle, a disk mounted on the end of said arm so as to move in the liquid and damp the movements of the gage bar, and weights mounted on the shafts for balancing the elements.

ALFRED MAUL.

Witnesses:
  PAUL ARRAS,
  CLÄRE SIMON.

Copies of this patent may be obtained for five cents each, by addressing the "Commissioner of Patents, Washington, D. C."